United States Patent
Doerr

(10) Patent No.: US 6,724,952 B2
(45) Date of Patent: Apr. 20, 2004

(54) WAVELENGTH SELECTIVE CROSS-CONNECT (WSC)

(75) Inventor: Christopher Richard Doerr, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 399 days.

(21) Appl. No.: 09/809,125

(22) Filed: Mar. 15, 2001

(65) Prior Publication Data

US 2002/0131677 A1 Sep. 19, 2002

(51) Int. Cl.[7] .............................. G02B 6/42; G02B 6/28
(52) U.S. Cl. ............................ 385/16; 385/24; 385/33; 385/42
(58) Field of Search ........................ 385/16–24, 32, 385/33, 37, 45, 46; 359/124, 127, 130

(56) References Cited

U.S. PATENT DOCUMENTS 5,915,051 A * 6/1999 Damask et al. ............... 385/16
6,504,970 B2 * 1/2003 Doerr ............................ 385/24

OTHER PUBLICATIONS

Wilfong et al., "WDM Cross–Connect Architectures with Reduced Complexity," Journal of Lightwave Technology, vol. 17, No. 10, 1732–1741 (Oct., 1999).

Doerr et al., "2 × 2 Wavelength–Selective Cross Connect Capable of Switching 128 Channels in Sets of Eight," IEEE Photonics Technology Letters, vol. 14, No. 3, 387–389 (Mar., 2002).

* cited by examiner

Primary Examiner—Frank G. Font
Assistant Examiner—Michael P. Mooney

(57) ABSTRACT

A wavelength-selective cross connect switch is disclosed that can selectively pass a multi-wavelength incoming signal received on a given incoming port to a corresponding output port in a bar state; or cross the received signal to an opposite output port in a cross state, using only two wavelength blockers and a number of optical circulators. Power splitters divide the power of each incoming signal in half and the half-power signals are applied to the two wavelength blockers surrounded by corresponding optical circulators. Each of the wavelength blockers control either the bar state or the cross state. The outputs of the two wavelength blockers are combined to produce an output signal at each of the output ports. Thus, the wavelength-selective cross connect can selectively pass or cross an incoming signal to an appropriate output port, as desired. The disclosed wavelength-selective cross connects can be serviced without interrupting traffic. In addition, the disclosed wavelength-selective cross connect requires only shutters, i.e., the wavelength blocker, and is significantly easier to manufacture than a device requiring switches.

20 Claims, 3 Drawing Sheets

WAVELENGTH SELECTIVE CROSS-CONNECT (WSC)

FIELD OF THE INVENTION

The present invention relates to optical communication networks and, more particularly, to optical devices for routing multi-wavelength optical signals.

BACKGROUND OF THE INVENTION

When multiple users share a transmission medium, some form of multiplexing is required to provide separable user sub-channels. There are many multiplexing techniques available that simultaneously transmit information signals within the available bandwidth, while still maintaining the quality and intelligibility that are required for a given application. Optical communication systems, for example, increasingly employ wavelength division multiplexing (WDM) techniques to transmit multiple information signals on the same fiber, and differentiate each user sub-channel by modulating it with a unique wavelength of invisible light. WDM techniques are being used to meet the increasing demands for increasing speed and bandwidth in optical transmission applications.

In optical communication networks, such as those employing WDM techniques, individual optical signals are often selectively routed to different destinations. Thus, a high capacity matrix or wavelength selective cross-connect (WSC) switch is often employed to selectively route signals through interconnected nodes in a communication network. Many wavelength selective cross-connect switches used in optical communication networks are either manual or electronic, requiring multiple optical-to-electrical and electrical-to-optical conversions. The speed and bandwidth advantages associated with transmitting information in optical form, however, makes an all-optical network the preferred solution for WDM-based optical networks. Moreover, all-optical network elements are needed to provide the flexibility for managing bandwidth at the optical layer (e.g., on a wavelength by wavelength basis).

One problem with the current design of wavelength selective cross-connect switches is that to service the WSC, both fiber optic lines must be broken. As the demand for optical bandwidth increases in WDM communication systems, it is desirable to increase the number of channels. The number of wavelength channels in commercial fiber optic line systems, for example, now typically exceeds one hundred channels. Unfortunately, an increase in the number of channels provides a corresponding increase in the size, cost and insertion loss of the optical devices in such WDM communication systems. More specifically, filters that can handle all the channels independently with wide, flat bands become very large and difficult to make with high yields, regardless of the technology. A need therefore exists for an improved wavelength selective cross-connect switch that permits serviceability without traffic interruption in an efficient manner. A further need exists for an improved wavelength selective cross-connect switch that uses a periodic filter design to tradeoff flexibility for greater device simplicity.

SUMMARY OF THE INVENTION

Generally, a wavelength-selective cross connect switch is disclosed that can selectively pass a multi-wavelength incoming signal received on a given incoming port to a corresponding output port in a bar state; or cross the received signal to an opposite output port in a cross state. The wavelength-selective cross connect is fabricated using only two wavelength blockers and a number of optical circulators.

Power splitters divide the power of each incoming signal in half and the half-power signals are applied to the two wavelength blockers surrounded by corresponding optical circulators. Each of the wavelength blockers control either the bar state or the cross state. The outputs of the two wavelength blockers are combined to produce an output signal at each of the output ports. Thus, the wavelength-selective cross connect can selectively pass or cross an incoming signal to an appropriate output port, as desired.

The disclosed wavelength-selective cross connects can be serviced without interrupting traffic. For instance, suppose one of the wavelength blockers needs to be replaced. The network can be configured so that all of the channels are in the bar state. Then the blocker can be removed without interrupting any traffic. Another main advantage of the present invention is that a device that requires only shutters, i.e., the wavelength blocker, is significantly easier to make than a device requiring switches, such as typical WSCs.

A more complete understanding of the present invention, as well as further features and advantages of the present invention, will be obtained by reference to the following detailed description and drawings.

DETAILED DESCRIPTION

Figure 1:
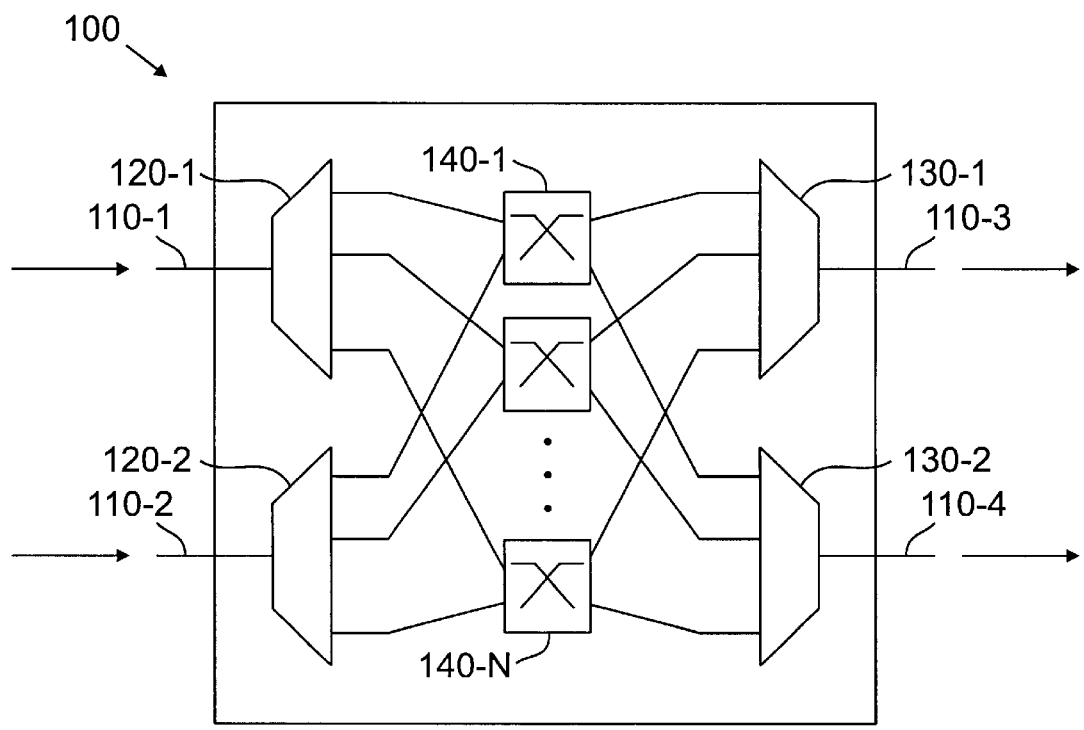
FIG. 1 illustrates a wavelength-selective cross connect switch, such as those used in a communication system having multiple fiber rings.

FIG. 1 illustrates a wavelength-selective cross connect 100 that may be used, for example, in a communication system having multiple fiber rings. As shown in FIG. 1, the wavelength-selective cross connect 100 is an optical device having two input ports 110-1 and 110-2 and two output ports 110-3 and 110-4. An incoming signal received on a given incoming port 110-1 and 110-2 is selectively (i) passed to the corresponding output port 110-3 or 110-4, respectively, in a bar state; or (ii) crossed to the opposite output port 110-4 or 110-3, respectively, in a cross state. The wavelength-selective cross connect 100 consists of two wavelength blockers 105-1 and 105-2, which may each be embodied, for example, as the wavelength blocker disclosed in contemporaneously filed U.S. patent application Ser. No. 09/809,124, filed Mar. 15, 2001, entitled "Planar Lightwave Wavelength Blocker," assigned to the assignee of the present invention and incorporated by reference herein.

In addition, the wavelength-selective cross connect 100 of FIG. 1 includes two demultiplexers 120-1 and 120-2 and two multiplexers 130-1 and 130-2 connected by 2×2 switches 140-1 through 140-N. In this manner, the wavelength-selective cross connect 100 can selectively pass or cross an incoming signal to an appropriate output port, as desired.

Figure 2:
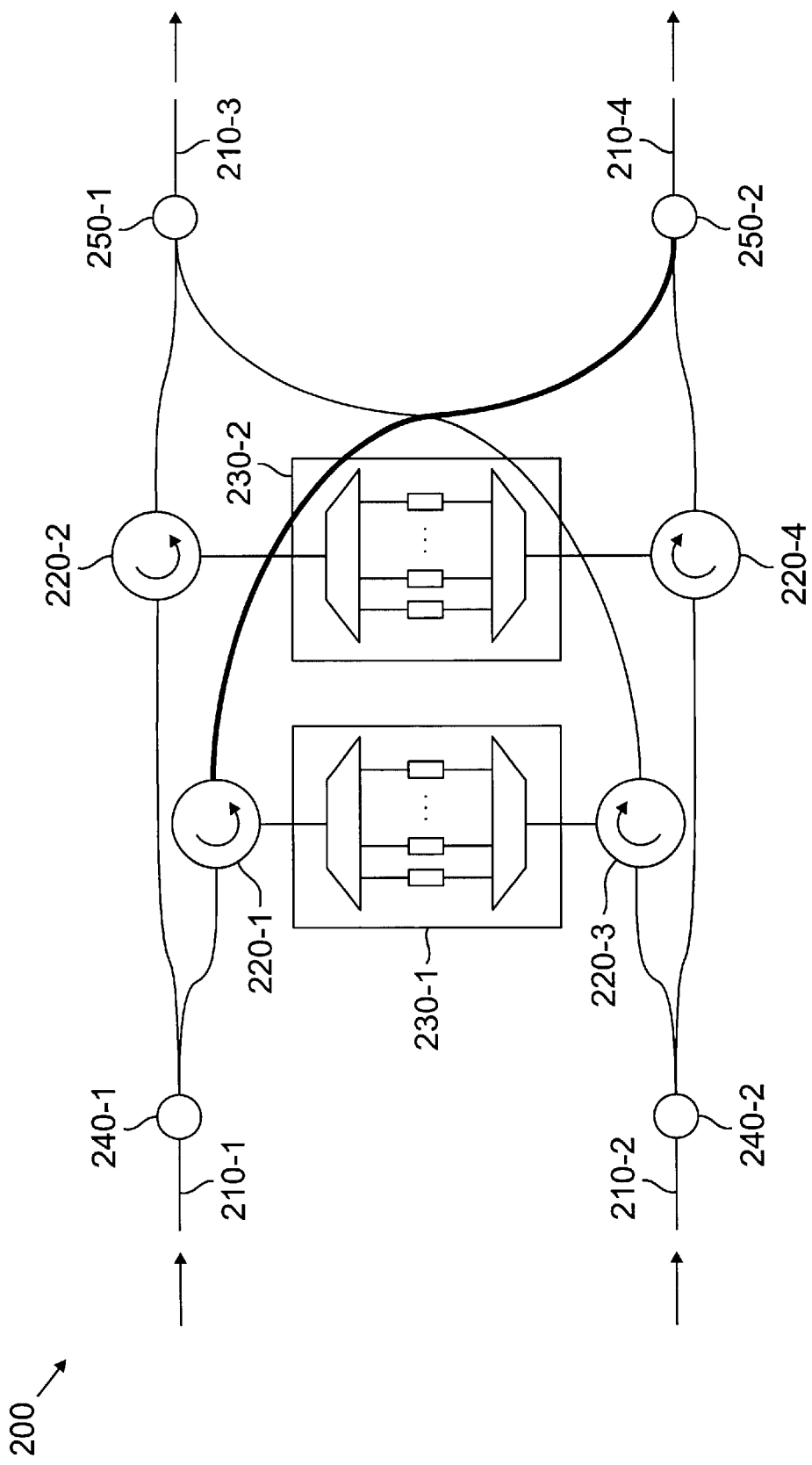
FIG. 2 illustrates a wavelength-selective cross connect in accordance with the present invention.

FIG. 2 illustrates a wavelength-selective cross connect 200 in accordance with the present invention. The wavelength-selective cross connect 200 may be used, for example, in a communication system having multiple fiber rings. As shown in FIG. 2, the wavelength-selective cross connect 200 has two input ports 210-1 and 210-2 and two output ports 210-3 and 210-4. A multi-wavelength incoming signal received on a given incoming port 210-1 or 210-2 is selectively (i) passed to the corresponding output port 210-3 or 210-4, respectively, in a bar state; or (ii) crossed to the opposite output port 210-4 or 210-3, respectively, in a cross state.

As shown in FIG. 2, the wavelength-selective cross connect 200 also includes four optical circulators 220-1 through 220-4 and two wavelength blockers 230-1 and 230-2. The optical circulators 220-1 through 220-4 may each be embodied, for example, as a JDS Uniphase Circulator, model number CR5500. Generally, the exemplary optical circulators 220-1 through 220-4 shown in FIG. 2 are three port devices, where a multi-wavelength signal received on one port is passed to the next port in a counter-clockwise fashion.

The wavelength blockers 230-1 and 230-2 may each be embodied, for example, as any wavelength blocking device, such as the periodic planar wavelength blockers disclosed in U.S. patent application Ser. No. 09/798,501, filed Mar. 2, 2001, entitled "A Wavelength Filter That Operates On Sets of Wavelength Channels," or contemporaneously filed U.S. patent application Ser. No. 09/809,124, now U.S. Pat. No. 6,504,970 entitled "Planar Lightwave Wavelength Blocker," filed Mar. 15, 2001, each assigned to the assignee of the present invention and incorporated by reference herein. An exemplary wavelength blocker 300 is discussed further below in conjunction with FIG. 3. The exemplary wavelength blocker 300 is a silica planar waveguide with thermo-optic phase shifters because of the potential for large-volume manufacturability, and because it is natural in waveguides to make a high-order grating, suitable for a periodic filter. The periodicity of the filter makes the device much smaller, with lower loss, and lower power consumption, at the expense of channel-control flexibility.

In addition, the wavelength-selective cross connect 200 of FIG. 2 includes two power splitters 240-1 and 240-2 and two power combiners 250-1 and 250-2. The power splitters 240-1 and 240-2 divide the power of each incoming signal in half and the half-power signals are applied to the two wavelength blockers 230-1 and 230-2 surrounded by two corresponding optical circulators 220-1 through 220-4. In the exemplary implementation, the first wavelength blocker 230-1 controls the bar state, and the second wavelength blocker 230-2 controls the cross state. The outputs of the two wavelength blockers 230-1 and 230-2 are combined in two power combiners 250-1 and 250-2. For example, suppose the two $\lambda_1$ channels should stay in their rings but the two $\lambda_2$ channels should cross between the rings. Then the first blocker 230-1 passes $\lambda_1$ and blocks $\lambda_2$, and vice versa for the second blocker 230-2.

In this manner, the wavelength-selective cross connect 200 can selectively pass or cross an incoming signal to an appropriate output port, as desired. Thus, while 2×2 broadcast-and-select switches, such as the wavelength-selective cross connect 100 shown in FIG. 1, typically require four wavelength blockers, the wavelength-selective cross connect 200 in accordance with the present invention requires only two wavelength blockers 230-1 and 230-2, at the expense of four optical circulators 220-1 through 220-4.

Another advantage of the present invention is that the optical devices can be serviced without interrupting traffic. For instance, suppose the second blocker 230-2 needs to be replaced. One can set up the network so that all of the channels are in the bar state. Then the second blocker 230-2 can be removed without interrupting any traffic. Another main advantage is that a device that requires only shutters, the blocker, is significantly easier to make than one requiring switches, the conventional WSC. For example, a blocker needs no waveguide crossings. Other advantages include the fact that the filter spectral response can be the same for both the bar and cross states, aiding the cascadability; and one can multicast for the purpose of, for example, 1+1 protection. 1+1 protection is the transmitting of two copies of a signal, each on a separate path, for the purpose of signal-loss protection in case one path fails.

Figure 3:
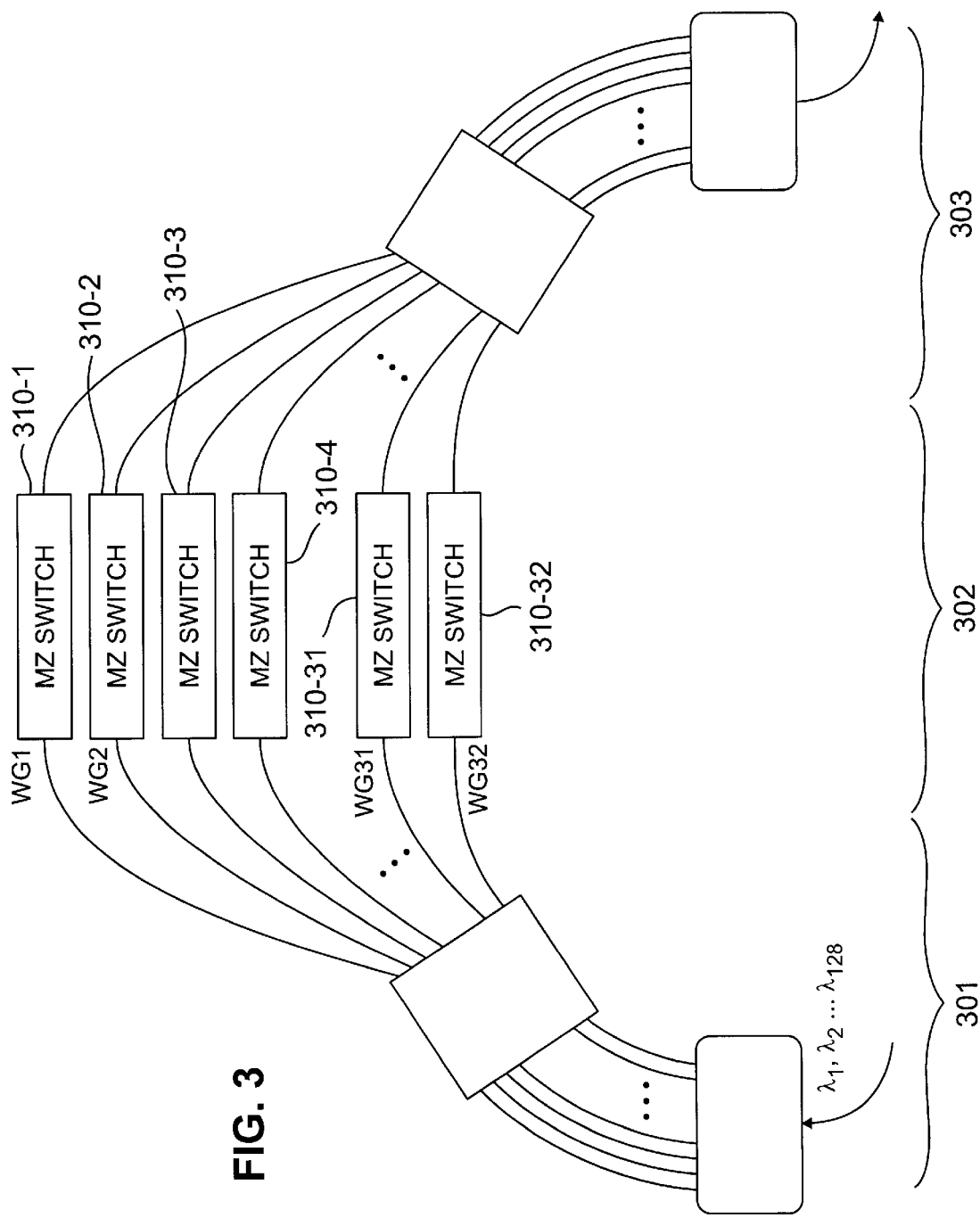
FIG. 3 illustrates an exemplary wavelength blocker that may be employed in the wavelength-selective cross connect of FIG. 2.

FIG. 3 illustrates a suitable wavelength blocker 300, although any type of wavelength blocker that can operate in a bidirectional fashion would be suitable. As shown in FIG. 3, the wavelength blocker 300 is comprised of a demultiplexer 301, a waveguide lens 302 and a multiplexer 303. The waveguide lens 302 is comprised of a number of equal-length waveguide lenses, each associated, for example, with a Mach-Zehnder switch or Mach-Zehnder interferometer shutter, such as those described in U.S. Pat. No. 5,136,671 to Dragone or M. Okuno et al., "Silica-Based Thermo-Optic Switches," NTT Review, Vol. 7, No. 5 (September 1995), each incorporated by reference herein. Alternatively, the shutters may be embodied, for example, as electro-absorption modulators or Y-branch switches. The demultiplexer 301 and multiplexer 303 can be embodied as planar waveguide gratings, such as those described in U.S. Pat. No. 5,002,350 to C. Dragone. It is noted that the waveguide gratings for the demultiplexer 301 and multiplexer 303 need not be the same. The Mach-Zehnder interferometer shutters can be activated thermooptically, for example, via chrome heaters.

The exemplary periodic wavelength blocker 300 supports 128 channels ($\lambda_1 \lambda_2 \ldots \lambda_{128}$) separated into 16 sets, each set containing 8 channels. Thus, demultiplexer 301 produces 16 demultiplexer output signals, each of which has 8 channels. In one embodiment, each wavelength channel from the demultiplixer 301 is carried by two equal length waveguides, WG. The two Mach-Zehnder switches associated with the two equal-length waveguides carrying the same demultiplexer output signal work in concert to pass or block the demultiplexer output signal. For a more detailed discussion of this multiple equal-length waveguides per signal arrangement, see U.S. patent application Ser. No. 09/798,501, filed Mar. 2, 2001, entitled "A Wavelength Filter That Operates On Sets of Wavelength Channels," incorporated by reference herein above. Among other benefits, this multiple equal-length waveguides per signal arrangement provides individual passbands having a flat frequency spectrum for each channel and the entire response is completely flat when no channels are dropped or added. It can be shown that the exemplary wavelength blocker 200 has a resulting length of about 9.5 cm in typical silica waveguides.

For example, the equal-length waveguides $WG_1$ and $WG_2$ carry a demultiplexer output signal of 8 channels ($\lambda_1, \lambda_{17}, \lambda_{33}, \lambda_{49}, \lambda_{65}, \lambda_{81}, \lambda_{97}, \lambda_{113}$) and the equal-length waveguides $WG_{31}$ and $WG_{32}$ carry a demultiplexer output signal of another 8 channels ($\lambda_{16}, \lambda_{32}, \lambda_{48}, \lambda_{64}, \lambda_{80}, \lambda_{96}, \lambda_{112}, \lambda_{128}$). It is noted that although the exemplary wavelength blocker 300 is illustrated with two waveguides per channel, additional equal-length waveguides per signal can be employed.

The present invention recognizes that a wavelength blocker 300 does not need to give access to the dropped channels. Thus, the wavelength blocker 300 in accordance with the present invention employs a transmissive design with evenly distributed lens arms. It is noted that prior techniques configured the waveguide lens in a reflective fashion in order to access the drop channels. See, C. R. Doerr et al., "40-Wavelength Add-Drop Filter," IEEE Photon. Technol. Lett., Vol. 11, 1437–1439 (1999). When configured in a reflective fashion, the polishing angle and flatness of the reflective facet is generally inaccurate enough to cause large phase differences between adjacent lens arms. In addition, the lens waveguides of a reflective wavelength blocker are arranged in pairs, in order to give room for the waveguides containing the drop channels to reach the facet between the mirror stripes that reflect back the lens waveguides for the express channels, making the environments for adjacent lens waveguides different, resulting in different birefringences for each lens arm. Also, most likely because the waveguide core sidewalls are typically somewhat slanted, there is polarization conversion in the bends and adjacent lens arms curve in different directions at certain points. Thus, the polarization dependence of the reflective grating-lens-grating is generally more than 1 dB, making it unusable for most long-haul systems.

It is to be understood that the embodiments and variations shown and described herein are merely illustrative of the principles of this invention and that various modifications may be implemented by those skilled in the art without departing from the scope and spirit of the invention.

I claim:

1. A wavelength-selective cross connect, comprising:
   a first wavelength blocker corresponding to a bar state;
   a second wavelength blocker corresponding to a cross state;
   a pair of optical circulators surrounding said first wavelength blocker; and
   a pair of optical circulators surrounding said second wavelength blocker.

2. The wavelength-selective cross connect according to claim 1, further comprising a power splitter at each input port to divide the power of each incoming signal in half.

3. The wavelength-selective cross connect according to claim 1, further comprising a power combiner at each output port to produce an output signal for each output port, each of said power combiners connecting an optical circulator from an input of one said wavelength blockers and an optical circulator from an output of another of said wavelength blockers.

4. The wavelength-selective cross connect according to claim 1, wherein said wavelength blockers include a shutter array having a plurality of shutters for coupling a demultiplexer to a multiplexer using a plurality of waveguides having approximately equal length, wherein said plurality of shutters selectively passes N wavelength channels.

5. The wavelength-selective cross connect according to claim 4, wherein said plurality of shutters are embodied as Mach-Zehnder switches.

6. The wavelength-selective cross connect according to claim 4, wherein said plurality of shutters are controlled by a thermo-optic effect.

7. The wavelength-selective cross connect according to claim 4, wherein said plurality of shutters are controlled by an electro-optic effect.

8. The wavelength-selective cross connect according to claim 4, wherein a plurality of said waveguide lenses carry each of said N wavelength channels.

9. The wavelength-selective cross connect according to claim 4, wherein a plurality of said shutters are associated in series with each of said plurality of waveguide lenses.

10. A wavelength-selective cross connect, comprising:
    a first periodic planar wavelength blocker corresponding to a bar state;
    a second periodic planar wavelength blocker corresponding to a cross state;
    a pair of optical circulators surrounding said first wavelength blocker; and
    a pair of optical circulators surrounding said second wavelength blocker.

11. The wavelength-selective cross connect according to claim 10, further comprising a power splitter at each input port to divide the power of each incoming signal in half.

12. The wavelength-selective cross connect according to claim 10, further comprising a power combiner at each output port to produce an output signal for each output port, each of said power combiners connecting an optical circulator from an input of one said periodic planar wavelength blockers and an optical circulator from an output of another of said periodic planar wavelength blockers.

13. The wavelength-selective cross connect according to claim 10, wherein said periodic planar wavelength blockers include a shutter array having a plurality of shutters for coupling a demultiplexer to a multiplexer using a plurality of waveguides having approximately equal length, wherein said plurality of shutters selectively passes N wavelength channels.

14. The wavelength-selective cross connect according to claim 13, wherein said plurality of shutters are embodied as Mach-Zehnder switches.

15. The wavelength-selective cross connect according to claim 13, wherein a plurality of said waveguide lenses carry each of said N wavelength channels.

16. The wavelength-selective cross connect according to claim 13, wherein a plurality of said shutters are associated in series with each of said plurality of waveguide lenses.

17. A method for switching an input wavelength-division multiplexed signal received on an input port comprising N wavelength channels, said method comprising the steps of:
    selectively passing said wavelength-division multiplexed signal to a corresponding output port using a first wavelength blocker in a bar state;
    selectively crossing said wavelength-division multiplexed signal to an opposite output port using a second wavelength blocker in a cross state;
    surrounding said first wavelength blocker with a pair of optical circulators; and
    surrounding said second wavelength blocker with a pair of optical circulators.

18. The method according to claim 17, further comprising the step of splitting the power at each input port to divide the power of each incoming signal in half.

19. The method according to claim 17, further comprising the step of combining power at each output port to produce an output signal for each output port and connecting an optical circulator from an input of one said wavelength blockers and an optical circulator from an output of another of said wavelength blockers.

20. The method according to claim 17, wherein said wavelength blockers include a shutter array having a plurality of shutters for coupling a demultiplexer to a multiplexer using a plurality of waveguides having approximately equal length, wherein said plurality of shutters selectively passes N wavelength channels.

* * * * *